Figure 1:
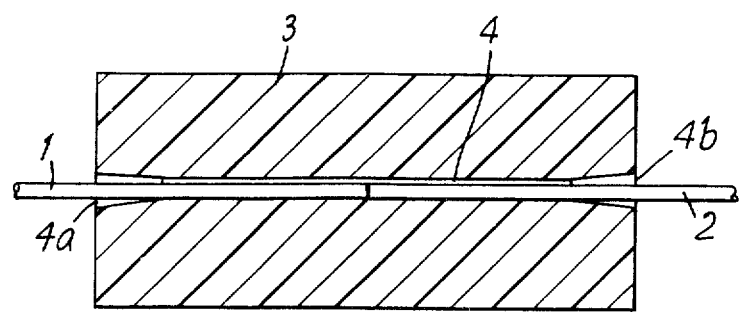

United States Patent [19]

Kent et al.

[11] 3,944,328
[45] Mar. 16, 1976

[54] IN-LINE COUPLING OF TWO LENGTHS OF LINEAR OPTICAL WAVEGUIDE ELEMENTS

[75] Inventors: Alan Hugh Kent, Wokingham; Peter Howard Fell, Maidenhead, both of England

[73] Assignee: Plessey Handel und Investments AG., Zug, Switzerland

[22] Filed: Aug. 8, 1974

[21] Appl. No.: 495,913

[30] Foreign Application Priority Data
Sept. 1, 1973 United Kingdom............... 41236/73

[52] U.S. Cl.................. 350/96 C; 350/320; 249/142
[51] Int. Cl.²............................................ G02B 5/14
[58] Field of Search. 350/96 C, 96 R, 96 B, 96 WG, 350/320; 156/158; 249/142

[56] References Cited
UNITED STATES PATENTS

| 599,939 | 3/1898 | Kunzler | 249/142 |
|---|---|---|---|
| 745,117 | 11/1903 | Rees | 249/142 |
| 1,792,046 | 2/1931 | Skaupy | 350/96 B |
| 3,455,668 | 7/1969 | Upton | 350/96 C |
| 3,734,594 | 5/1973 | Trambarulo | 350/96 C |
| 3,810,802 | 5/1974 | Buhite et al | 350/96 C |

OTHER PUBLICATIONS
Bisbee, D. L., "Optical Fiber Joining Technique," B.S.T.J., Vol. 50, No. 10, Dec., 1971 pp. 3153-3158.

Primary Examiner—Alfred E. Smith
Assistant Examiner—Jon W. Henry
Attorney, Agent, or Firm—Fleit & Jacobson

[57] ABSTRACT

The adjacent ends of two waveguide elements are coupled in mutual alignment by being slid into a suitably dimensioned through bore of a coupling block from the two flared ends of the bore respectively, preferably in the presence of a small quantity of a liquid having a refractory index similar to that of the waveguide elements and preferably also having adhesive qualities to retain the waveguide elements in their mutually abutting coupled position in the block. The coupling block is preferably formed by casting, using a low-shrinkage resin such as epoxy resin in a mould whose end walls have aligned bores for a stainless steel wire which extends through the mould cavity to form the through bore of the block, this wire being withdrawn after setting of the resin. Preferably tapered core portions through which the bores extend coaxially, are provided in the mould and withdrawable endwise to permit removal of the cast block from the mould cavity.

7 Claims, 2 Drawing Figures

U.S. Patent   March 16, 1976   3,944,328

IN-LINE COUPLING OF TWO LENGTHS OF LINEAR OPTICAL WAVEGUIDE ELEMENTS

This invention relates to linear optical waveguide elements such for example as optical fibres or strands of such fibres and has for an object to facilitate accurate in-line coupling of two such elements to be established with comparative ease, even in somewhat confined positions, and which ensures a good degree of optical continuity. One aspect of the invention consists in a method of establishing the in-line coupling of two optical waveguide elements of the same cross-section, which comprises the steps of (a) producing a block of epoxy-resin material having a through bore whose cross-section corresponds to that of the said waveguide elements but is slightly larger in its dimensions so that the elements are a sliding fit in the through bore, the through bore being flared at each end to provide a lead-in portion, by a process which includes: providing a mould having a mould cavity through which a tensioned wire whose surface does not adhere to the epoxy-resin material, extends from end to end of the cavity; filling this cavity with epoxy-resin moulding material and allowing the material to set; and withdrawing the wire longitudinally and removing the moulded resin body from the mould, and (b) inserting the two wave-guide elements into the through bore from the two ends thereof respectively to abut end-to-end at or near the centre of the through bore. This insertion is preferably effected in the presence of a liquid that is transmissive for the optical waves to be guided and has substantially the same index of refraction as the waveguide elements. In order to secure the two ends of the waveguide elements in the block in the coupled position, the liquid employed may be arranged to be of an adhesive nature so that on settinng and/or curing of the liquid retention will be automatically achieved. The wire employed to form the through bore, which may be stainless-steel wire, and which is kept under longitudinal tension, may be greased or otherwise prepared as necessary to prevent adhesion to the material of the block. The flared end portions of the through bore may be prepared either by the use of suitable core piece in the mould or moulding jig or by machining of the moulded block. Another aspect of the invention consists in the combination comprising a pair of waveguide elements which are coupled in mutually aligned abutting relation by accommodation of their mutually abutting ends in a through bore of a block that consists of epoxy-resin material and has been produced by a process which includes (a) providing a mould having a mould cavity through which a tensioned wire whose surface does not adhere to the epoxy-resin material, extends from end to end of the cavity; filling this cavity with epoxy-resin moulding material and allowing the material to set; and withdrawing the wire longitudinally and removing the moulded resin body from the mould, and (b) inserting the two waveguide elements into the through bore from the two ends thereof respectively to abut end-to-end at or near the centre of the through bore, the cross section of said through bore corresponding to that of said waveguide elements but being slightly larger in its dimensions so that the elements are a sliding fit in the through bore, and the through bore being flared at each end to provide a lead-in portion. A jig for the casting or moulding of the coupling block may comprise a trough-like mould having two parallel end walls each equipped with a tapered core member projecting from the end wall into the mould cavity said core members being coaxially aligned with each other, and aligned through bores being provided in each thus equipped end wall coaxial with said core members to permit a metal wire to be passed through the aligned holes so as to extend lengthwise through the mould cavity, the core members being adapted to be withdrawn axially from the moulded block alone or in conjunction with all or part of the said end walls.

Figure 2:
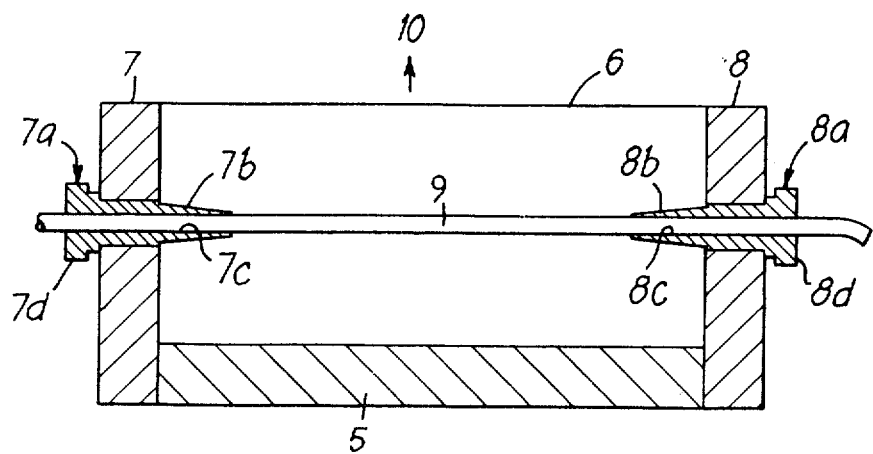

In order that the invention may be more readily understood, reference will now be made to the accompanying drawing, in which:

FIG. 1 is an elevation in section along the axis of the waveguide members, showing the adjacent end portions of two optical waveguide elements secured in in-line coupling relation in a coupling block, and FIG. 2 is an elevation of a preferred form of jig for the casting or moulding of the waveguide-coupling block in section along the axis of the metal wire for the formation of a through bore.

Referring now first to FIG. 1, the end portions of two optical fibres, or of two strands of optical fibres, or of two other waveguide elements 1, 2 of identical cross-section are coupled end to end in mutual alignment by means of a coupling member constituted by a block 3 of epoxy-resin plastics material. In the case of unclad fibres this material must not transmit the radiation to be conducted by the waveguide elements and/or have a sufficiently smaller index of refraction than these elements to avoid interfering with the total-reflection effect required for the waveguide action. This block is provided with a rectilinear through bore 4 in a manner which will be described further below. For the greater part of its length, this bore is cylindrical and has a cross-section slightly larger than that of the waveguide elements 1 and 2 so as to enable these elements to be moved in the bore 4 by longitudinal sliding movement while maintaining the elements in substantial alignment with each other, and at each end of the moulded body 3 the bore 4 has an outwardly flared lead-in portion 4a and 4b respectively. In order to couple the adjacent ends of the two waveguide elements 1 and 2, the two adjacent ends of these elements are dipped into a liquid having an index of refraction similar to that of the waveguide elements and are then inserted endwise into the bore 4 from the two ends respectively of the block 3, an operation which is facilitated by the flared lead-in portions 4a and 4b, in such a manner that eventually the ends of the two waveguide elements abut each other at or near the centre of the length of the block; the presence of the liquid will ensure a good degree of continuity of light conduction between the two adjacent ends of the light-guide elements. If the coupling connection is to be permanent, the liquid employed is preferably of such nature that it will, or can be made to, set and form an adhesive retaining the elements 1 and 2 in the block 3 in this position of mutual abutment in the bore 4, thus making it unnecessary to provide mechanical means for retaining the adjacent ends of the two elements in their coupled position. On the other hand, some form of mechanical retaining means, for example a wedge movable in a cross bore intersecting the through bore 4 over a portion of the diameter of the latter, can be arranged at suitable points between each end of the block 3 and the centre of its length.

In order to ensure that the bore 4 possesses good qualities as regards guidance and ease of insertion of the waveguide members 1 and 2, it is obtained by casting or moulding the block 3 round a straight wire, preferably a stainless-steel wire, under longitudinal tension. This method of producing an accurate, smooth-walled bore is made practicable by the fact that the block 3 is made of epoxy resin, which is a material which suffers very little shrinkage during setting.

FIG. 2 illustrates a casting or moulding jig which has been found advantageous for such manufacture of the block 3. This jig comprises a bottom-wall member 5 which, together with two side-wall members 6, forms an open trough of a cross-section corresponding to that of the block 3 to be cast, and the ends of this trough are closed by end-wall members 7 and 8 respectively. Each end wall member is equipped with a set-in core piece 7a and 8a, and a tapered portion 7b and 8b respectively of each core piece projects from the end wall into the interior of the mould. These two core pieces are arranged in coaxial alignment, and each has a coaxial bore 7c and 8c respectively, so that a stainless-steel wire 9 can be inserted to extend in a straight line through the aligned bores 7c and 8c along the mould cavity. Longitudinal tension may be applied to the wire if necessary or desired to retain it in a straight, rectilinear condition. In the illustrated embodiment the core pieces 7a, 8a extend through the end walls 7 and 8, and each is provided at its outer end with a flange or head portion 7d or 8d, by which the core piece can be withdrawn axially so that its tapered portion 7b, 8b, clears the mould cavity. When thereafter the wire 9 has been withdrawn longitudinally, the cast body can be lifted from the mould cavity in the direction of the arrow 10. Alternatively the core pieces 7a and 8a may be permanently fixed in the end walls 7 and 8 respectively while the latter are secured in a detachable manner to the bottom and side walls 5 and 6 of the moulding jig. In that case the tapered core portions 7b and 8b can be withdrawn from the cast body by suitable movement of the end-wall members 7 and 8. It will also be appreciated that whilst in describing the illustrated embodiment reference has, for the sake of simplicity, been made to only one through bore 4 in each block 3, the invention is not limited in that respect; on the contrary, any desired number of parallel bores, each having flared ends, may be arranged in a coupling block to permit the use of a single block for the respective coupling of a corresponding number of pairs of waveguide elements.

What we claim is:

1. A method of establishing the in-line coupling of two optical waveguide elements of the same cross-section, which comprises the steps of (a) producing a block of epoxy-resin material having a through bore whose cross-section corresponds to that of the said waveguide elements but is slightly larger in its dimensions so that the elements are a sliding fit in the through bore, the through bore being flared at each end to provide a lead-in portion, by a process which includes: providing a mould having a mould cavity through which a tensioned wire whose surface does not adhere to the epoxy-resin material, extends from end to end of the cavity; filling this cavity with epoxy-resin moulding material and allowing the material to set; and withdrawing the wire longitudinally and removing the moulded resin body from the mould, and (b) inserting the two waveguide elements into the trough bore from the two ends thereof respectively to abut end-to-end at or near the centre of the through bore.

2. A method as claimed in claim 1, which includes the step of securing the waveguide elements in the block in their mutually coupled relation.

3. A method as claimed in claim 1, wherein the insertion of the elements into the through bore is effected in the presence of a liquid that is transmissive for the optical waves to be guided and has substantially the same index of refraction as the waveguide elements.

4. A method as claimed in claim 1, wherein the insertion of the elements into the through bore is effected in the presence of a liquid that is transmissive for the optical waves to be guided and has substantially the same index of refraction as the waveguide elements, and which is of an adhesive nature so that upon consolidation of the liquid retention of the waveguide elements in the through bore will be automatically achieved.

5. A method as claimed in claim 1, wherein the flared end portions of the through bore are prepared by the use of withdrawable core pieces in the mould.

6. The combination comprising a pair of waveguide elements which are coupled in mutually aligned abutting relation by accommodation of their mutually abutting ends in a through bore of a block that consists of epoxy-resin material and has been produced by a process which includes (a) providing a mould having a mould cavity through which a tensioned wire whose surface does not adhere to the epoxy-resin material, extends from end to end of the cavity; filling this cavity with epoxy-resin moulding material and allowing the material to set; and withdrawing the wire longitudinally and removing the moulded resin body from the mould, and (b) inserting the two waveguide elements into the through bore from the two ends thereof respectively to abut end-to-end at or near the centre of the through bore, the cross-section of said through bore corresponding to that of said waveguide elements but being slightly larger in its dimensions so that the elements are a sliding fit in the through bore, and the through bore being flared at each end to provide a lead-in portion.

7. A combination as claimed in claim 3, wherein a plurality of pairs of waveguide elements are respectively coupled to each other by accommodation of the mutually abutting ends of each pair in one of a plurality of bores provided in mutually parallel relation in said block of epoxy-resin material.

* * * * *